US007366391B2

(12) United States Patent
Ellison et al.

(10) Patent No.: US 7,366,391 B2
(45) Date of Patent: Apr. 29, 2008

(54) HYBRID WIRE-FIBER MANAGEMENT

(75) Inventors: Steven W. Ellison, Mead, WA (US); Chris Aaron Dinwoodie, Colbert, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 11/419,968

(22) Filed: May 23, 2006

(65) Prior Publication Data
US 2006/0275009 A1 Dec. 7, 2006

Related U.S. Application Data

(60) Provisional application No. 60/687,628, filed on Jun. 3, 2005.

(51) Int. Cl.
*G02B 6/00* (2006.01)
(52) U.S. Cl. ...................................... 385/135; 385/134
(58) Field of Classification Search ................. 385/135
See application file for complete search history.

(56) References Cited

U.S. PATENT DOCUMENTS

| 4,664,471 A | 5/1987 | Mignien et al. |
| 4,773,729 A | 9/1988 | Mignien |
| 4,824,196 A | 4/1989 | Bylander |
| 5,100,221 A | 3/1992 | Carney et al. |
| 5,323,480 A | 6/1994 | Mullaney et al. |
| 5,363,466 A | 11/1994 | Milanowski et al. |
| 5,708,751 A * | 1/1998 | Mattei ........................ 385/135 |
| 5,956,449 A | 9/1999 | Otani et al. |
| 5,982,972 A * | 11/1999 | Tucker et al. ................ 385/135 |
| 6,009,224 A | 12/1999 | Allen |
| 6,250,816 B1 * | 6/2001 | Johnston et al. .............. 385/53 |
| 6,263,141 B1 | 7/2001 | Smith |
| 6,322,378 B1 | 11/2001 | Auclair |
| 6,360,050 B1 | 3/2002 | Moua et al. |
| 6,385,381 B1 * | 5/2002 | Janus et al. .................. 385/135 |
| 6,418,266 B1 | 7/2002 | Vitantonio |
| 6,434,316 B1 | 8/2002 | Grois et al. |
| 6,438,310 B1 | 8/2002 | Lance et al. |
| 6,575,640 B2 | 6/2003 | Connelly et al. |
| 6,591,051 B2 | 7/2003 | Solheid et al. |
| 6,631,237 B2 * | 10/2003 | Knudsen et al. ............ 385/134 |
| 6,633,717 B1 | 10/2003 | Knight et al. |
| 6,870,734 B2 * | 3/2005 | Mertesdorf et al. ......... 361/684 |
| 6,925,241 B2 | 8/2005 | Bohle et al. |
| 6,980,725 B1 * | 12/2005 | Swieconek ................... 385/135 |

(Continued)

OTHER PUBLICATIONS

ADC Telecommunications Inc. enclosure displayed at the International Engineering Consortium (IEC) SUPERCOMM Conference, held in Chicago, IL, Jun. 6-9, 2005.

(Continued)

*Primary Examiner*—Frank G. Font
*Assistant Examiner*—Ryan Lepisto
(74) *Attorney, Agent, or Firm*—Lee & Hayes, PLLC

(57) ABSTRACT

Hybrid systems for managing wires and optical fibers include a first rack having trays for managing optical fibers, and a second rack proximate to the first rack. Modules are mounted to the second rack for managing wires. At least one of the racks is movable at least partially away from the other rack to provide access to both sides of each of the first and second racks.

27 Claims, 11 Drawing Sheets

U.S. PATENT DOCUMENTS

| | | | |
|---|---|---|---|
| 7,054,536 | B2 | 5/2006 | Sun |
| 7,102,884 | B2 | 9/2006 | Mertesdorf et al. |
| 2003/0206704 | A1 | 11/2003 | Lee et al. |
| 2004/0057691 | A1 | 3/2004 | Doss et al. |
| 2004/0175090 | A1 | 9/2004 | Vastmans et al. |
| 2005/0111809 | A1 | 5/2005 | Giraud et al. |
| 2005/0111810 | A1* | 5/2005 | Giraud et al. ............... 385/135 |
| 2005/0129379 | A1* | 6/2005 | Reagan et al. .............. 385/135 |
| 2005/0281526 | A1* | 12/2005 | Vongseng et al. ........... 385/135 |
| 2007/0047896 | A1* | 3/2007 | Kowalczyk et al. ........ 385/135 |
| 2007/0104447 | A1 | 5/2007 | Allen |

OTHER PUBLICATIONS

"Cable fixing Device D.E.P. Linx Notice d'Installation/Installing practice", Nexans Interface, 2 pages.

"Patching, Splicing and Coiling Module", Nexans Interface, 1U-12 Splices for 12 adapters, 1 page.

"Splicing and Coiling Module: 1U-24 Splices, Left or Right Opening" Nexans Interface, 1 page.

"Storage Optical Module, Left or Right Opening", Nexans Interface, 1 page.

Three photographs of a bracket made by Pirelli Cable Corporation, at least as early as Sep. 30, 2004, 1 page.

"Vario-Spleissbox 3: Vario-Splice Box 3:", 3 pages.

* cited by examiner

HYBRID WIRE-FIBER MANAGEMENT

RELATED APPLICATIONS

This application claims the benefit of U.S. Provisional Application No. 60/687,628, filed Jun. 3, 2005, which is incorporated by reference herein.

TECHNICAL FIELD

The following disclosure relates generally to systems for managing and organizing signal-transmission lines, such as wires and optical fibers. More specifically, the disclosure relates to hybrid systems for managing and organizing signal-carrying wires and optical fibers.

BACKGROUND

Copper wires have long been used in the telecommunications industry to transmit information within and between individual telecommunications facilities. More recently, telecommunications facilities have begun to replace the aging copper wires with optical fibers. Optical fibers are able to transmit large volumes of data and voice signals over relatively long distances, with little or no signal degradation. For this reason, optical fibers have become widely used in the telecommunication field. However, the cost of replacing the existing copper based telecommunications infrastructure is substantial. Accordingly, telecommunications providers typically upgrade their infrastructures in sections, migrating from copper wire to optical fiber gradually.

The systems used to manage and organize optical fibers are often different than those used to manage wires, since, for example, optical fibers tend to be more susceptible to damage from bending than wires. Thus, when a telecommunications company replaces a section of wires with optical fibers, they must also replace the systems used to manage that section of wires. In addition, the section of wires replaced may be only a portion of the wires managed by a particular wire management system. In that case, it would be necessary to add an additional cabinet, rack, or other management system to handle the new fibers that replace the old section of wires. However, because floor space is often at a premium in a telecommunications facility, it is desirable to minimize the number of separate cabinets, racks, and/or other management systems.

SUMMARY

Hybrid systems for managing both wires and optical fibers are disclosed. Exemplary systems include a first rack having trays for managing optical fibers. A second rack is disposed proximate to the first rack, and modules are mounted to the second rack for managing wires. At least one of the racks is movable at least partially away from the other rack to provide access to both sides of each of the first and second racks.

In this manner a single hybrid system is configured to mange both wires and optical fibers, thus eliminating the need to use separate racks to manage wires and optical fibers, respectively. Additionally, as more wires are replaced by optical fibers, the hybrid system can be reconfigured over time to hold more and more new optical fibers in place of the old wires. Using such a hybrid system, telecommunications companies can easily migrate gradually from a wire-based system to an optical fiber-based system, without the need for additional racks or cabinets taking up precious floor space.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Hybrid cabinets are described, which are capable of managing both wires and optical fibers. Such cabinets may, for example, facilitate the replacement of wires of an existing wire-based communication infrastructure with optical fibers. In some implementations, the cabinets allow for replacement of only a portion of the wires managed by a particular wire management system, without the need to add an additional cabinet, rack, or other management system to handle the new fibers that replace the old section of wires.

Methods of migrating from a signal-carrying wire-based communications infrastructure to an optical fiber-based communications infrastructure using such hybrid cabinets are also described.

The implementations are described in the context of hybrid cabinets for managing wires and optical fibers in a telecommunications infrastructure. However, the implementations described herein may be used in other environments and are applicable to other contexts. For example, the cabinets may also be used to manage wires and optical fibers in local area communications infrastructures.

Exemplary Hybrid Cabinet

Figure 1:
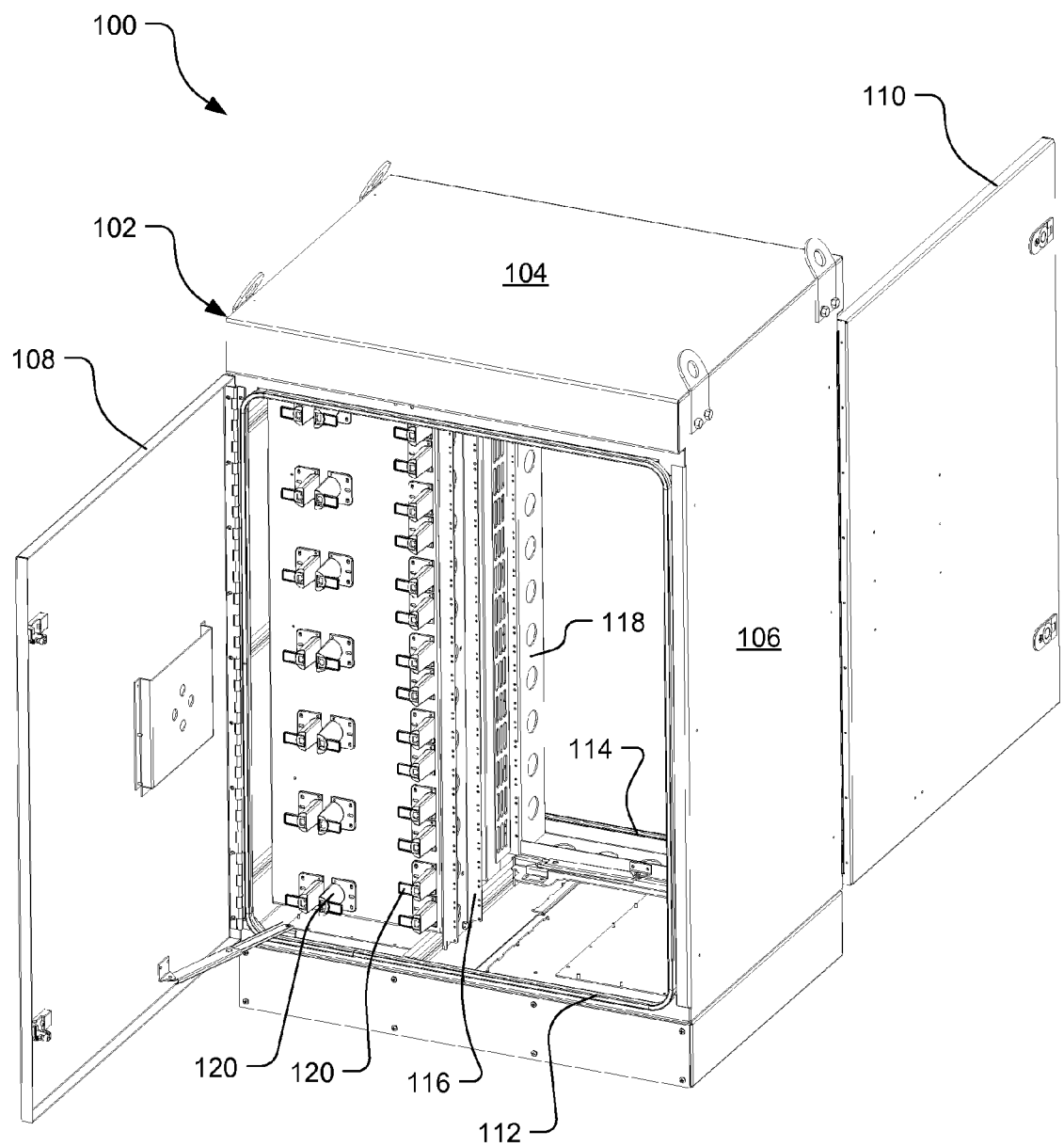
FIG. 1 is a front perspective view of one exemplary hybrid cabinet for managing wires and optical fibers.

FIGS. 1-5 illustrate a hybrid cabinet 100 according to one exemplary implementation. FIG. 1 is a front perspective view of the hybrid cabinet 100, and shows a housing 102 of the cabinet 100 comprising an enclosure, including a top surface 104, a bottom surface (not shown), two side surfaces 106, a front access door 108, and a rear access door 110. Throughout the specification, the terms "front," "rear," "top," "bottom," "right," and "left" refer the position or orientation of the cabinet as it is shown in FIG. 1. However, it should be understood that this convention is arbitrary and that the terms merely describe the position or orientation of one feature relative to another.

In this implementation, the housing 102 substantially encloses contents of the cabinet 100. When closed, the front access door 108 covers a front opening 112 and the rear access door 10 covers a rear opening 114. Weather stripping or other sealing material extends substantially around the front and rear openings 112 and 114 so that when the access doors 108 and 110 are closed, the cabinet provides a substantially weather-tight enclosure that protects the contents of the cabinet 100 from the weather. Thus, the cabinet 100 of FIG. 1 is suitable for use as an outdoor cabinet. In other implementations, however, cabinets may include housings that are only partially enclosed or are substantially open, or the housing may be omitted entirely.

Within the cabinet 100 are mounted two racks, a stationary rack 116 and a movable rack 118. The stationary rack 116 is configured to manage wires and has front and back faces. The movable rack 118 is configured to manage optical fibers, and also has front and back faces. The movable rack 118 is movable relative to the stationary rack 116 to provide access to both the front and back faces of both the stationary and movable racks 116 and 118. Alternatively, the stationary rack 116 could be configured to manage optical fibers, while the movable rack 118 could be configured to manage wires. In another alternative, one or both of the stationary and movable racks 116 and 118 could be configured to manage both wires and optical fibers. In still another alternative, both racks could be movable.

Slack storage bosses 120 are disposed in the cabinet 100 adjacent to the stationary rack 116 for storing and/or routing slack optical fibers and/or wires. While not shown, slack storage bosses could additionally or alternatively be disposed adjacent to the movable rack 118, or could be mounted on one or both of the stationary and movable racks 116 and 118. Also, numerous variations in shape, orientation, and/or arrangement of the slack storage bosses could be made and would be apparent to one of ordinary skill in the art.

Figure 2:
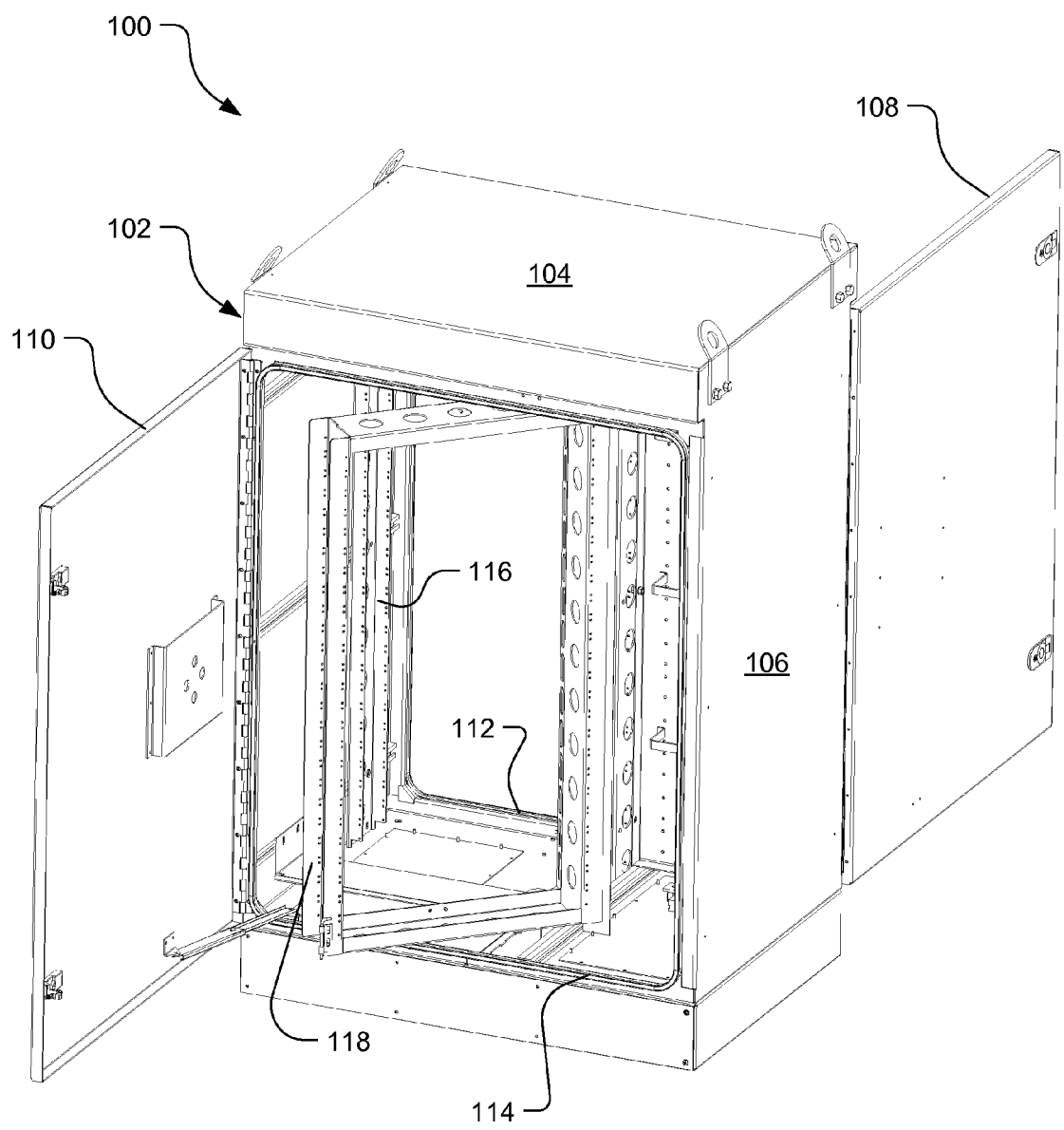
FIG. 2 is a rear perspective view of the hybrid cabinet of FIG. 1.

FIG. 2 is a rear perspective view of the cabinet 100, showing the movable rack 118 swung partially away from the stationary rack 116. The movable rack 118 is movable between a first position (shown in FIGS. 1 and 4) providing access to only one face of each of the stationary and movable racks, and a second position (the movable rack 118 is shown partially toward the second position in FIG. 2) providing access to both the front and back faces of both the stationary and movable racks 116 and 118. In the first position the movable rack 118 is proximately adjacent to the stationary rack such that adjacent faces of the stationary and movable racks are inaccessible. In the second position faces of the stationary and movable racks are spaced apart such that both front and back faces of each of the stationary and movable racks are accessible.

In the implementation shown in FIGS. 1-5, the movable rack 118 is pivotably movable relative to the stationary rack 116 and the rest of the cabinet 100, such that the movable rack 118 can be swung out to provide access to both faces of the movable rack. Alternatively, however, the movable rack could be configured to be slidably movable relative to the cabinet and the stationary rack, such that the movable rack could be slid out to provide access to both faces of the movable rack. In other alternatives, instead of one rack being stationary, both racks could be pivotable, both racks could be slidable, or one rack could be pivotable while the other is slidable. Still further, one or more additional stationary, pivotable, and/or slidable racks could be disposed in the cabinet in any desired configuration.

Figure 3:
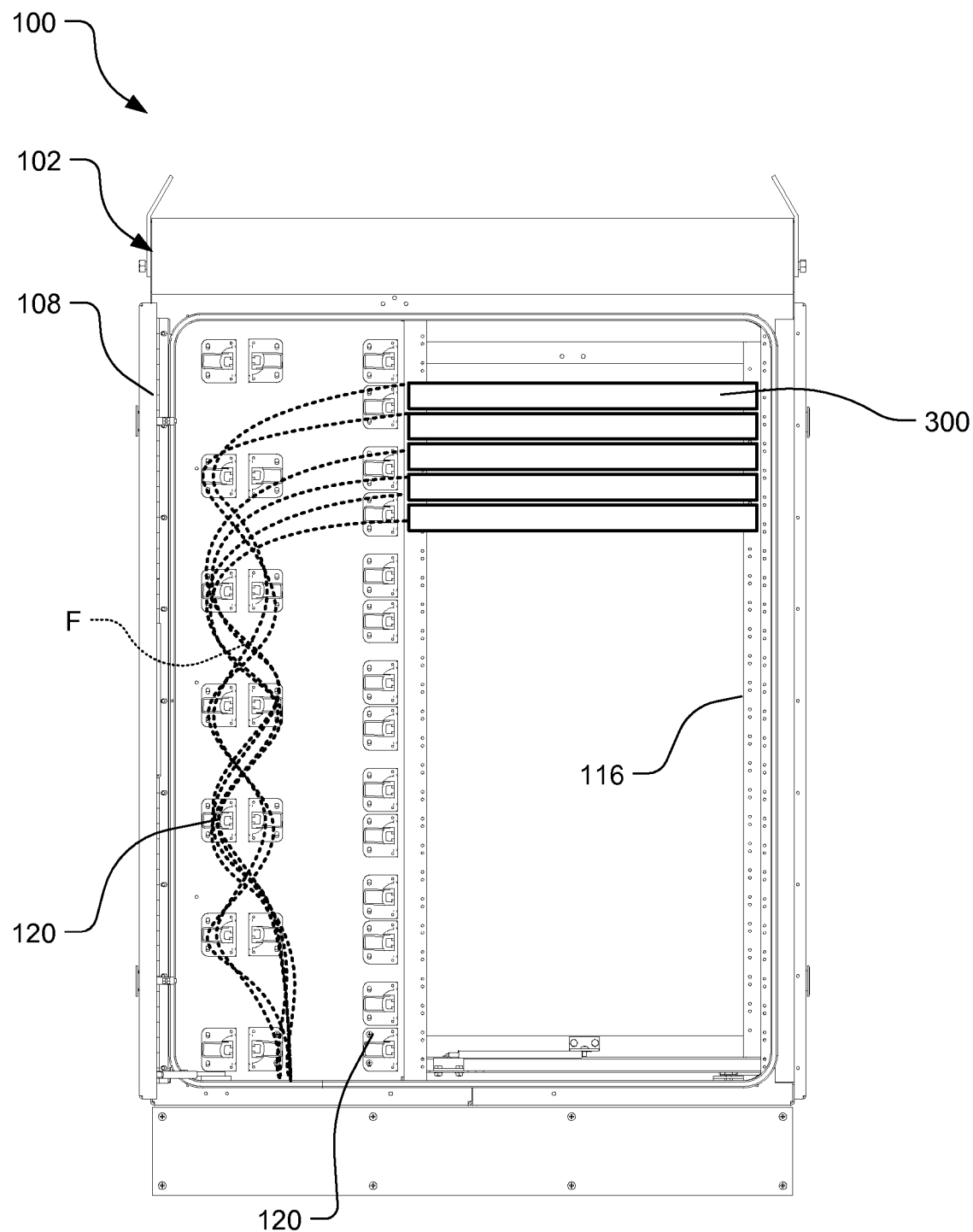
FIG. 3 is a front view of the hybrid cabinet of FIG. 1.

FIG. 3 is a front view of the hybrid cabinet 100, schematically showing a plurality of movable trays 300 coupled to the stationary rack 116 for managing optical fibers F. The movable trays 300 and fibers F are shown here, but have been omitted from the other figures for clarity. The trays 300 may include one or more fiber management structures for storing the fibers or connecting the fibers to one or more other fibers and/or fiber optic devices, such as attenuators, connectors, switches, multiplexers, splitters/combiners, or splices. The movable trays 300 are movable relative to the stationary rack 116 to provide access to the contents of the individual trays. The movable trays 300 may be pivotable relative to the stationary rack to provide access to the fiber management structure contained in the tray (as described in more detail below with respect to FIGS. 8 and 10). In that case, each tray may be pivotable about one or multiple axes. Alternatively, the trays 300 may be slidable relative to the stationary rack 116 to provide access to the fiber management structure contained in the tray.

Figure 4:
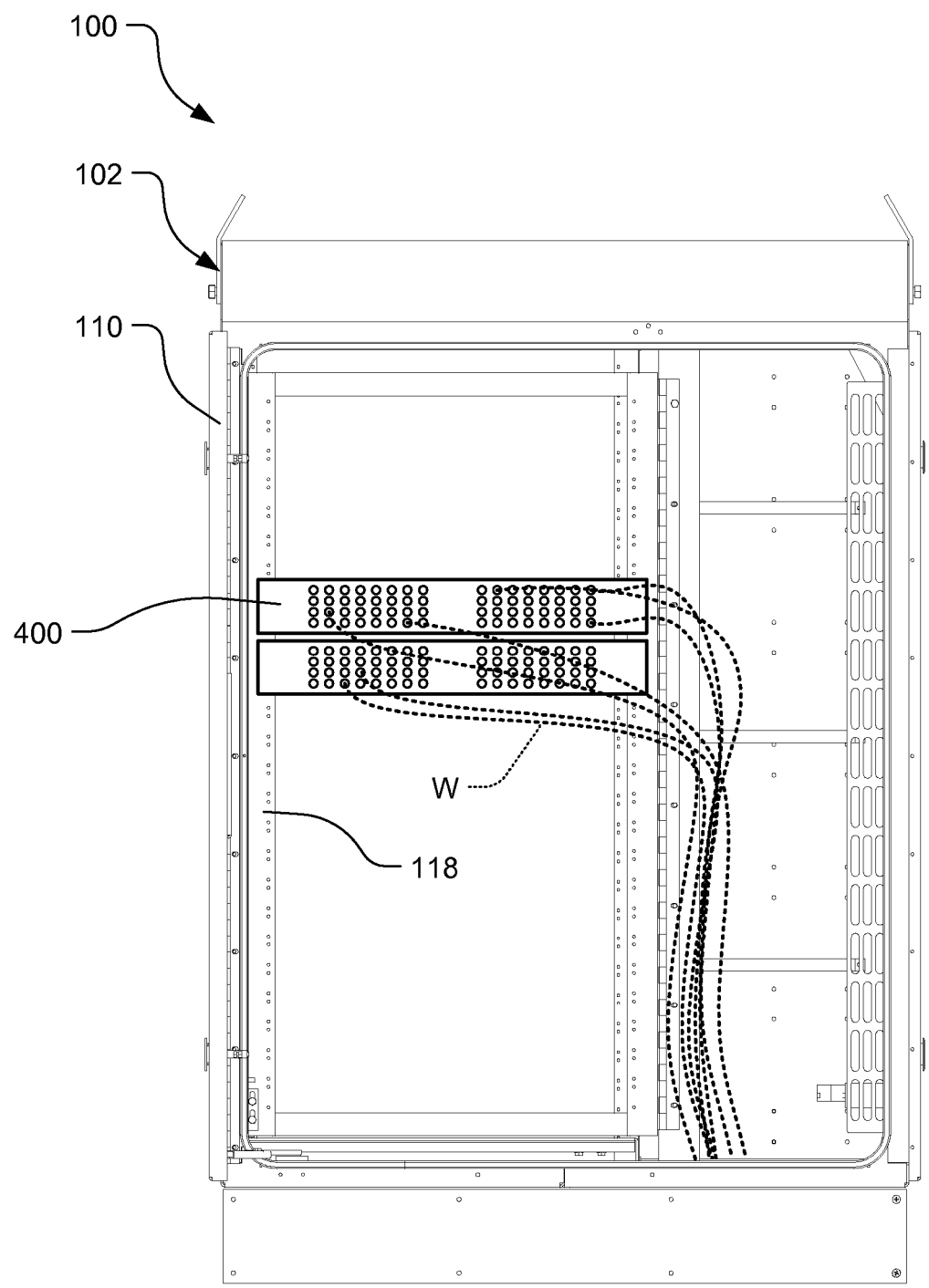
FIG. 4 is a rear view of the hybrid cabinet of FIG. 1.

FIG. 4 is a rear view of the hybrid cabinet 100, showing a plurality of modules 400 coupled to the movable rack 118 for managing the wires W. The modules 400 and wires W are shown here, but have been omitted from the other figures for clarity. The modules 400 may include wire management structures, such as digital cross-connect modules, splitters, combiners, patch connections, and the like. The modules 400 are shown in this figure as being fixed against movement relative to the movable rack 118. However, in other implementations, the modules could be pivotable and/or slidable (movable) relative to the movable rack 118. In another alternative, the modules could be movably mounted to a stationary rack.

In the foregoing configuration, having a stationary rack 116 with movable trays 300 and a movable rack 118 with fixed modules 400, when the movable rack 118 is in the first position, the trays 300 and modules 400 are each accessible from only one side (that is, the front of the trays 300 are accessible through the front access door 108, and the front of the modules 400 are accessible through the rear access door 110). When the movable rack 118 is in the second position, the trays 300 and modules 400 are accessible from both sides, since the movable rack 118 is pivoted away from the stationary rack 116. Thus, in the second position, access can be had to the front and back of the trays 300 and to the front and back of the modules 400. In one implementation, each tray 300 comprises a plurality of fiber optic cross connects, and each module 400 comprises a plurality of wire cross connects.

Figure 5:
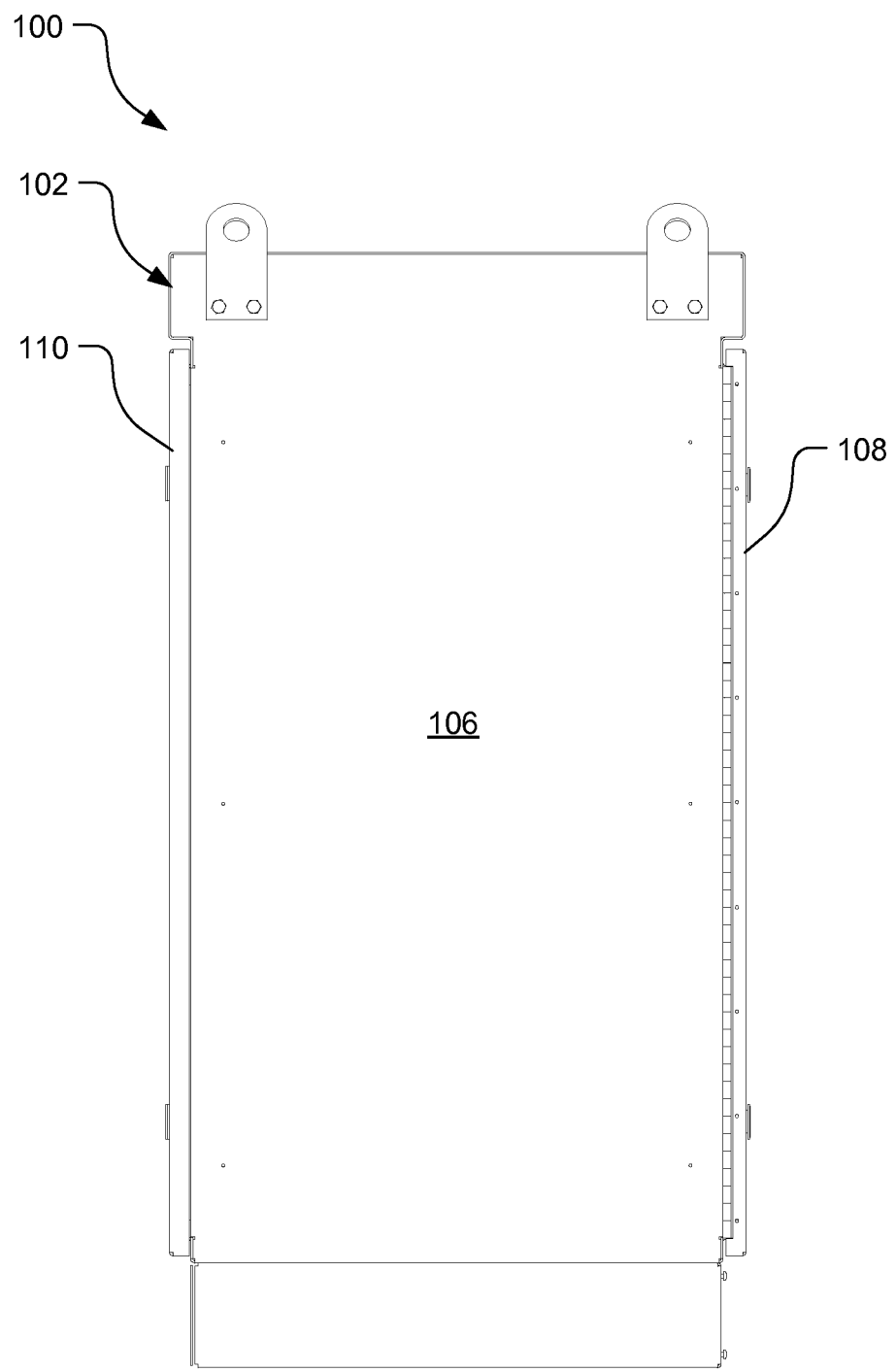
FIG. 5 is a side view of the hybrid cabinet of FIG. 1.

FIG. 5 is a side view of the hybrid cabinet 100, showing the front and rear access doors 108 and 110 in closed positions, in which the cabinet is substantially weather tight.

Second Exemplary Hybrid Cabinet

Figure 6:
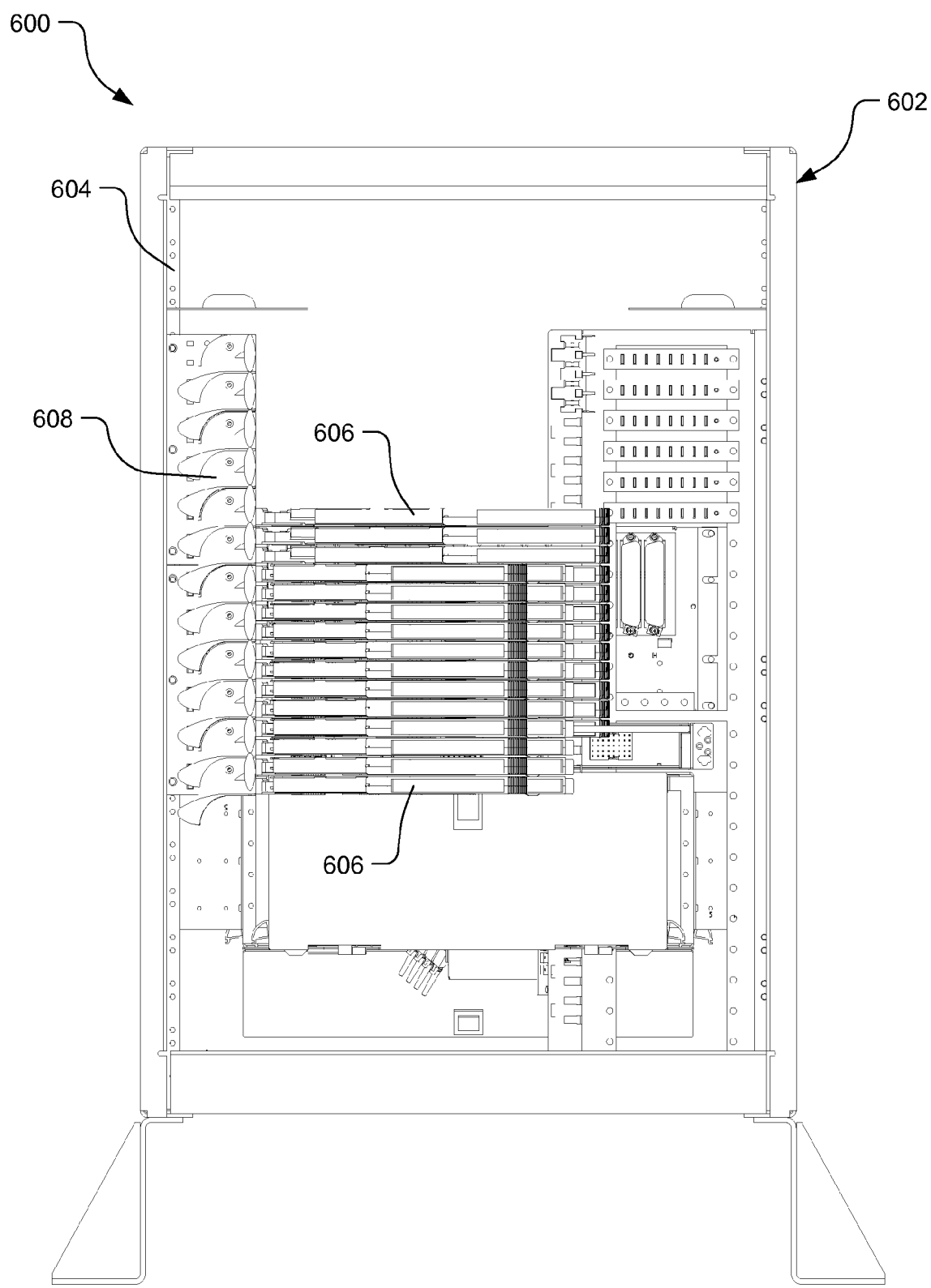
FIG. 6 is a front view of another exemplary hybrid cabinet for managing wires and optical fibers.
Figure 7:
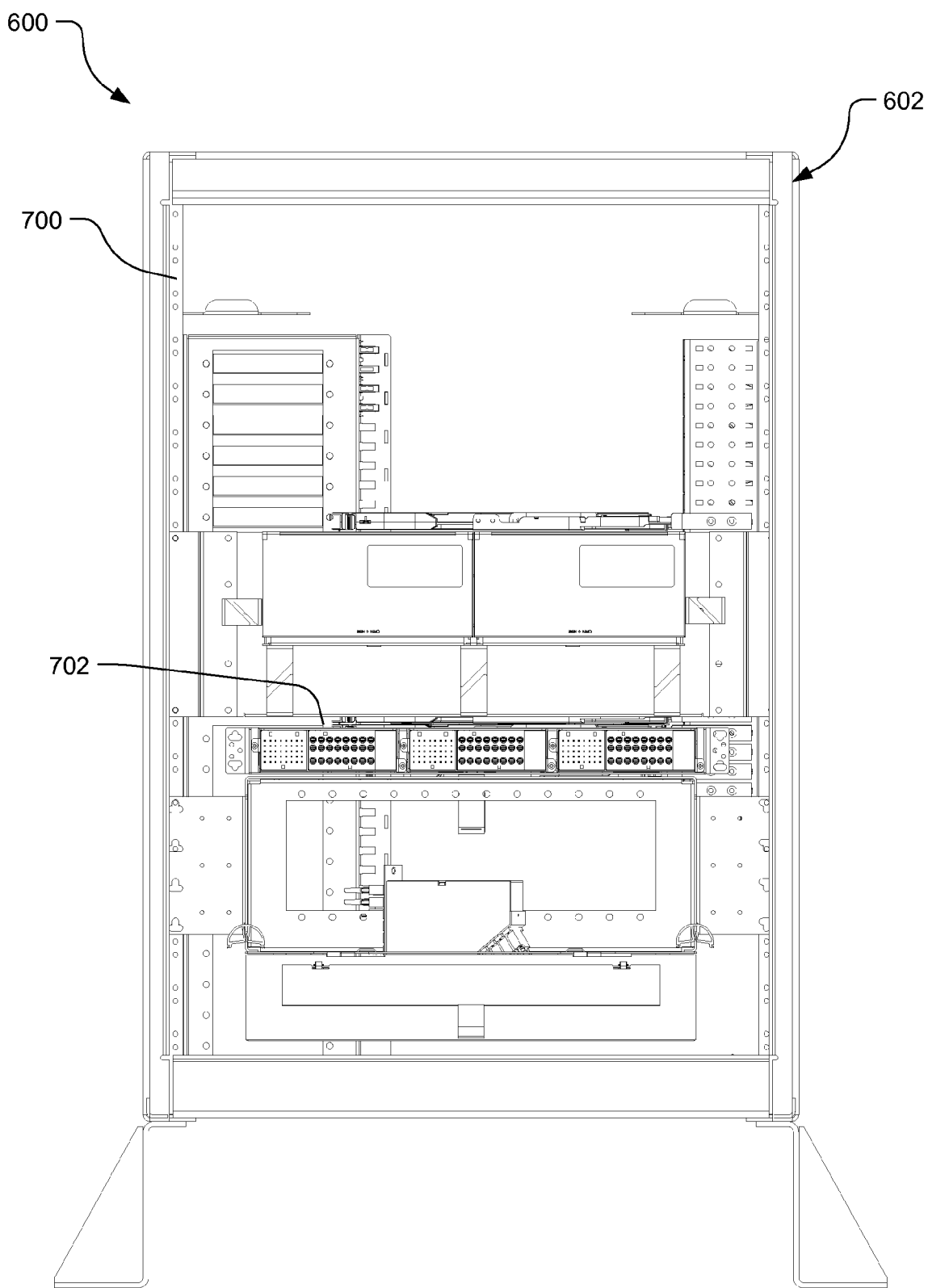
FIG. 7 is a rear view of the hybrid cabinet of FIG. 6.
Figure 8:
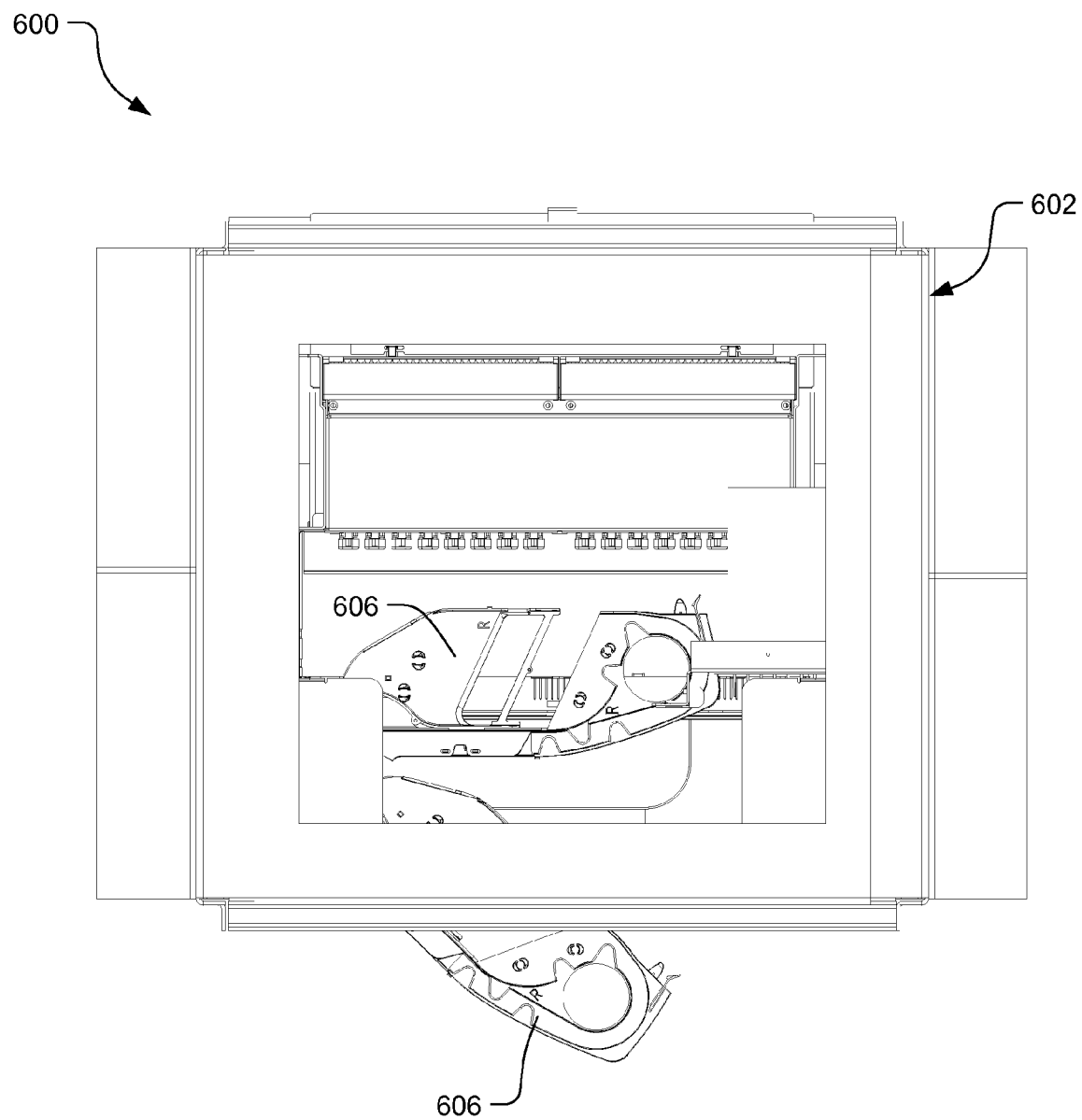
FIG. 8 is a plan view of the hybrid cabinet of FIG. 6.

FIGS. 6-8 illustrate another exemplary hybrid cabinet 600. In most respects, the cabinet 600 is similar to the hybrid cabinet of FIGS. 1-5. Therefore, only features of the cabinet 600 that differ will be described below. In this implementation, the cabinet 600 is at least partially open, having a generally open framework housing 602 allowing greater access and visibility to the contents of the cabinet 600. However, it should be understood that the cabinet 600 of this implementation could be modified to provide a substantially weather-tight enclosure.

FIG. 6 is a front view of the cabinet 600 and shows a first rack 604 in the cabinet 600 having a plurality of trays 606 for managing optical fibers. The trays 606 in this implementation are arranged vertically in a single stack of trays and are movable between a storage position within the cabinet and an extended position, in which they protrude from the cabinet to provide access to fiber connectors or other fiber management structure in the trays. The top three trays 606 are shown in a retracted position within the cabinet 600, while the remaining trays are shown swung partially outward toward the extended position to provide access to the trays. A better understanding of the relative positions of the trays can be had with reference to FIG. 8, discussed below. Fiber routing guides 608 are disposed along one side of the first rack to guide fibers to and from the trays 606.

FIG. 7 is a rear view of the cabinet 600 and shows a second rack 700 in the cabinet proximate to the first rack 604. A plurality of modules 702 is mounted to the second rack 700 for managing wires. The trays 606 and modules 702 of this implementation are the same and may contain the same components as those described above with respect to FIGS. 1-5.

At least one, and possibly both, of the first and second racks 604 and 700 is movable at least partially out of the cabinet 600 and away from the other of the first and second racks, to provide access to both sides of each of the first and second racks 604 and 700. In the first position the first rack 604 is proximately adjacent to the second rack 700, such that adjacent faces of the first and second racks are inaccessible. In the second position, faces of the first and second racks are spaced apart such that both front and back faces of each of the first and second racks are accessible. The movable rack(s) may be pivotable and/or slidable relative to the cabinet and/or one another. The pivoting and/or sliding motion of the movable one(s) of the rack(s) 604 and 700 is the same as that for the movable rack of FIGS. 1-5, so the description of that motion will be omitted here.

In one implementation, the trays 606 are movable relative to the first rack 604, and the modules 702 are fixed against movement relative to the second rack 700. However, as described with respect to the cabinet of FIGS. 1-5, in other implementations, trays 606 and/or modules 702 may be fixed to one or both of the first and second racks, they may be movably mounted (e.g., slidably or pivotably) to one or both of the first and second racks. Also, one or more additional stationary or fixed racks may be provided in the cabinet and may have trays and/or modules mounted to them in the foregoing manners as well.

FIG. 8 is a plan view of the cabinet 600, showing the manner in which trays 606 are pivotable between a storage position within the cabinet and an extended position, in which they protrude from the cabinet to provide access to fiber connectors or other fiber management structure in the trays.

Third Exemplary Hybrid Cabinet

Figure 9:
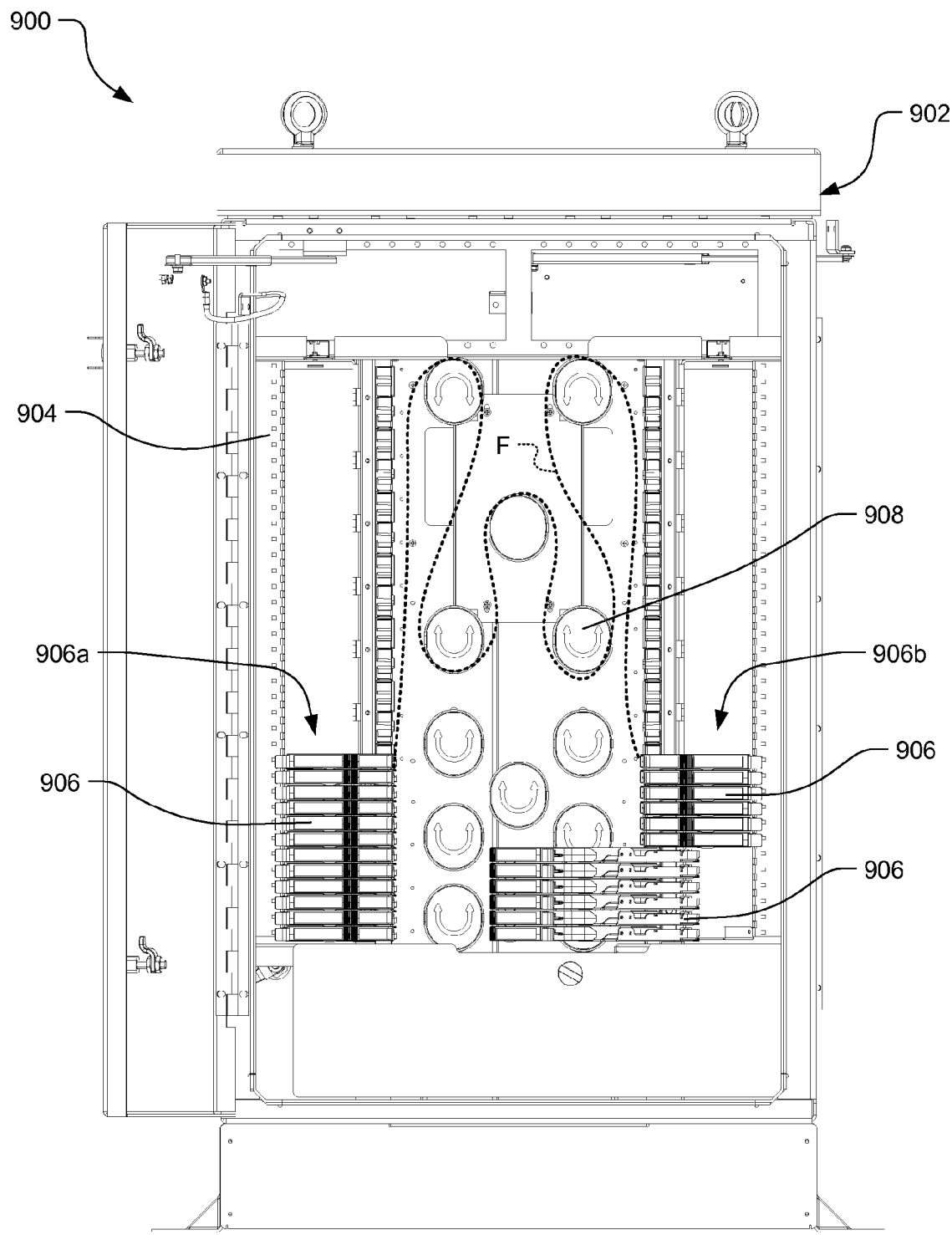
FIG. 9 is a front view of another exemplary hybrid cabinet for managing wires and optical fibers.
Figure 10:
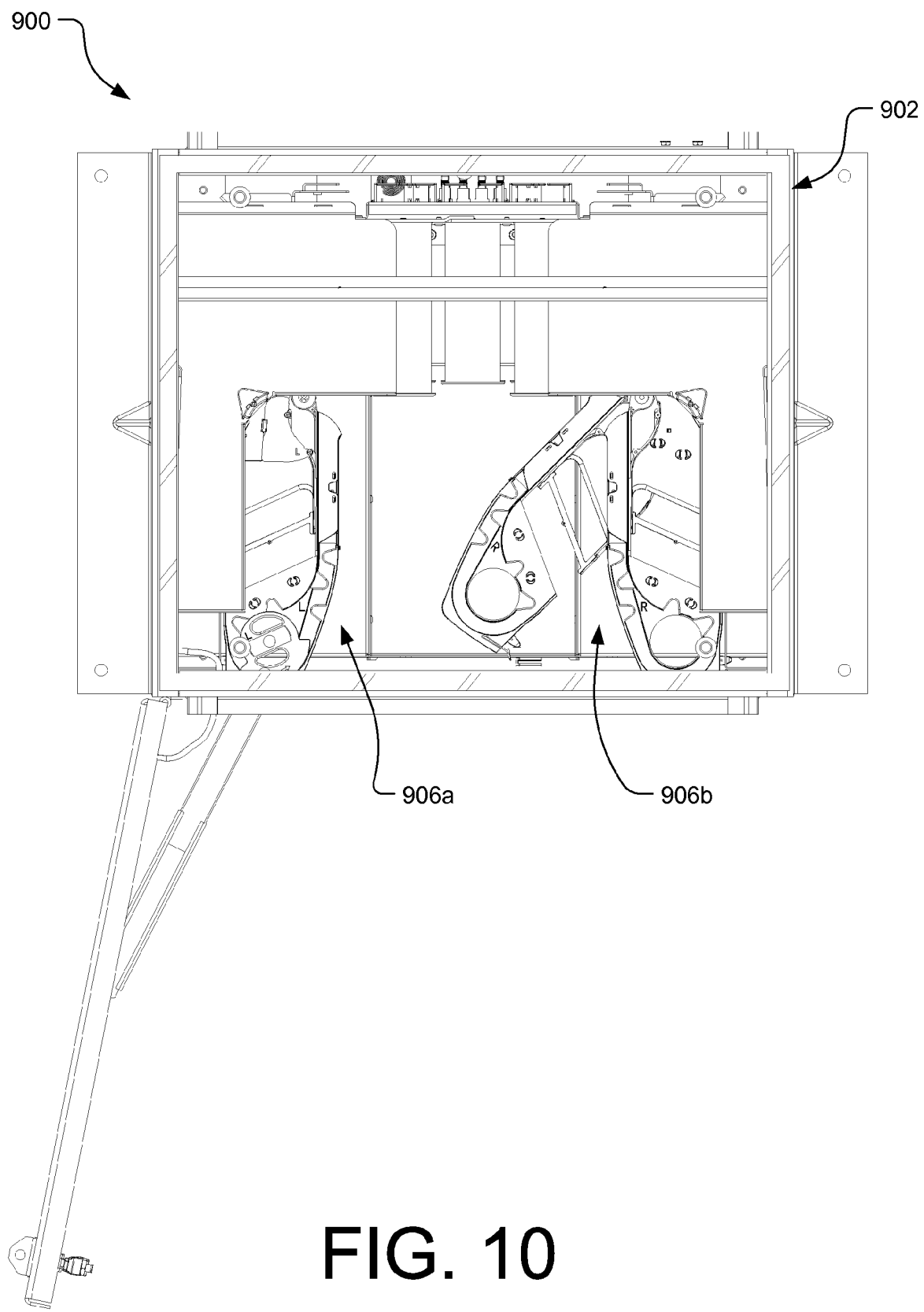
FIG. 10 is a plan view of the hybrid cabinet of FIG. 9.

FIGS. 9 and 10 illustrate another exemplary hybrid cabinet 900. In most respects, the cabinet 900 is similar to the hybrid cabinet of FIGS. 1-5. Therefore, only features of the cabinet 900 that differ will be described below. In this implementation, the cabinet 900 has a housing 902 that substantially encloses contents of the cabinet 900 and provides a substantially weather-tight enclosure, similar to that of the cabinet of FIGS. 1-5.

FIG. 9 is a front view of the cabinet 900 and shows a first rack 904 in the cabinet 900 having a plurality of trays 906 for managing optical fibers. The first rack 904 may be stationary, pivotable, or slidable, in which case it will function in substantially the same manner as the racks described in the foregoing implementations. Accordingly, further description of the first rack 904 will be omitted here.

The trays 906 in this implementation are arranged in two vertical stacks of trays, a first stack 906a of trays stacked vertically along one edge of the first rack 904, and second stack 906b of trays stacked vertically along an opposed edge of the first rack 904. Each tray is movable between a storage position adjacent one side of the cabinet 900 and an access position in the interior of the cabinet to provide access to fiber connectors or other fiber management structure in the trays. The trays in the left-hand stack 906a and the top six trays in the right-hand stack 906b are shown in the storage position, while the bottom six trays on the right-hand stack 906b are shown in the access position providing access to the contents of the trays. A better understanding of the relative positions of the trays can be had with reference to FIG. 10, discussed below.

Slack storage bosses 908 are disposed in a central region of the first rack 904 for storing slack or excess optical fibers and/or wires. The slack storage bosses 908 are arranged in a generally W-shape. Slack fibers F can be wrapped around the slack storage bosses 908 as shown in dashed lines in FIG. 9, or in any other desired configuration. As described with respect to the first implementation, numerous variations in shape, orientation, and/or arrangement of the slack storage bosses can be made and would be apparent to one of ordinary skill in the art. For example, slack storage bosses could additionally or alternatively be disposed adjacent to or on one or more racks of the cabinet 900.

A rear view of the cabinet 900 would be substantially identical to that shown in FIG. 7, except for the provision of a rear access door (not shown). The rear view would show a second rack with modules mounted thereto for managing wires. Accordingly, the rear view of the cabinet 900 and accompanying description have been omitted for brevity. However, it should be understood that trays and/or modules could be fixed to one or both of the first and second racks, and they could be movably mounted (e.g., slidably or pivotably) to one or both of the first and second racks. Also, one or more additional stationary or fixed racks could be provided in the cabinet and could have trays and/or modules mounted to them in the foregoing manners as well.

FIG. 10 is a plan view of the cabinet 900 of FIG. 9, with the top panel of the housing 902 removed for clarity. As shown in this view, all of the trays in the left-hand stack 906a are in the storage position adjacent the left side of the cabinet 900. Some of the trays in the right-hand stack 906b are in the storage position, while others are rotated toward the access position in the interior of the cabinet to provide access to fiber connectors or other fiber management structure in the trays.

While several different exemplary cabinets have been shown and described herein, it should be understood that the features of each of the cabinets may be rearranged, omitted, modified, and/or combined with one another. By way of example, either the single stack of outward-rotating trays shown in FIG. 6 or the dual stack of inward-rotating trays shown in FIG. 9 could be adapted for use in the cabinet of FIGS. 1-5. In another example, the W-shaped slack storage shown in FIG. 9 could be used in place of the slack storage bosses of the cabinet of FIGS. 1-5, and vice versa. In yet other examples, as described above, both racks could be stationary, both racks could be movable, additional movable and/or stationary racks could be added, and/or the trays and modules could be mounted to any one or more of the racks. Numerous other variations will be apparent to those of ordinary skill in the art.

The components of the cabinets can be made of any material having the desired combination of strength, cost, weight, electrical conductivity, and other material properties, and can be made by conventional manufacturing and assembling processes. Several suitable materials include, for example, metals, plastics, polymers, composites, and the like.

Exemplary Method of Migrating from Wire to Fiber

Figure 11:
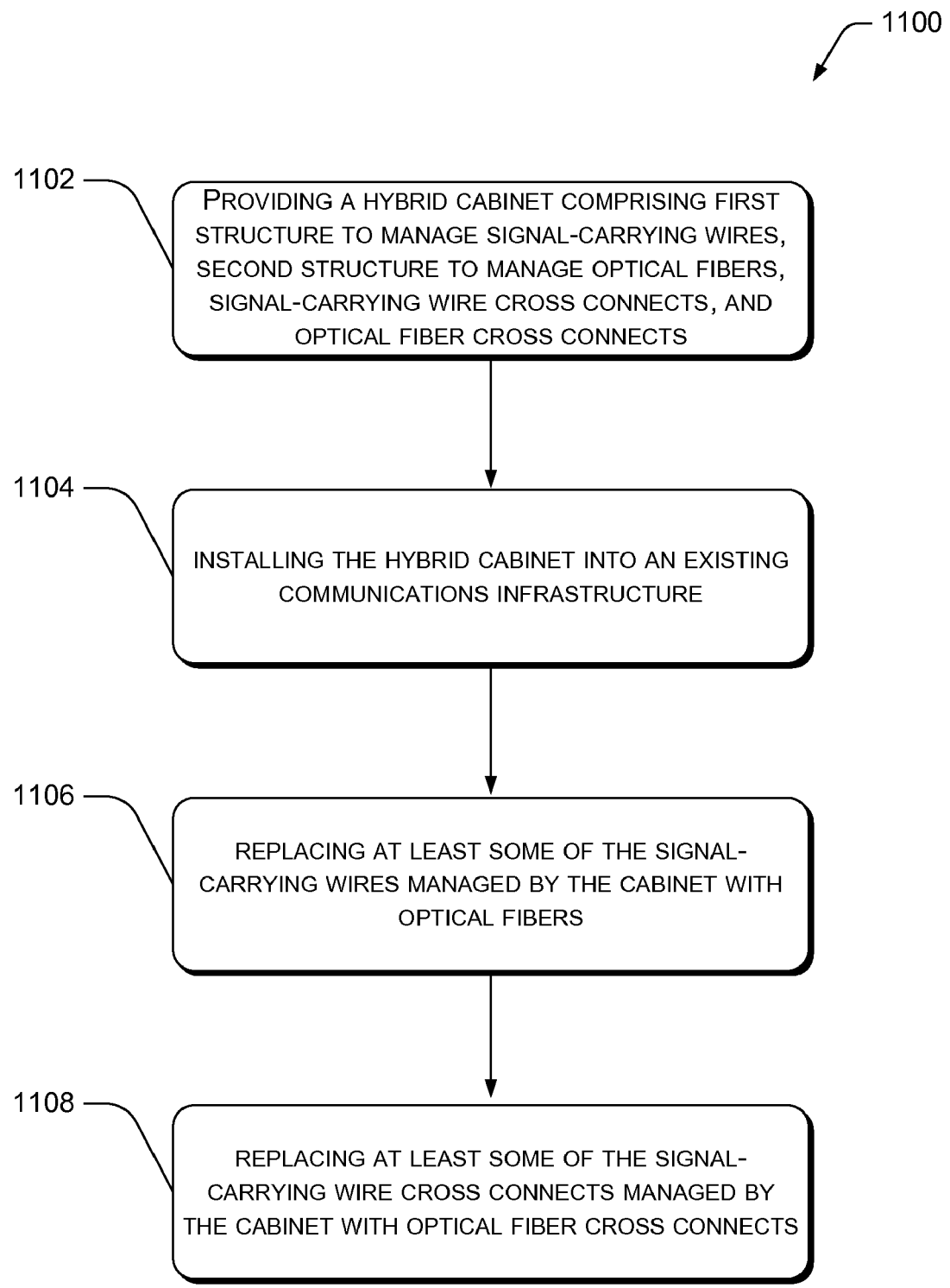
FIG. 11 is a flow chart showing an exemplary method of migrating from a signal-carrying wire-based communications infrastructure to an optical fiber-based communications infrastructure.

FIG. 11 is a flow chart showing an exemplary method 1100 of migrating from a signal-carrying wire-based communications infrastructure to an optical fiber-based communications infrastructure. The method 1100 may be implemented using hybrid cabinets such as the foregoing exemplary implementations, or combinations, modifications, or variations thereof.

As shown at block 1102, the method 1100 comprises providing a hybrid cabinet, which in one implementation comprises first structure to manage signal-carrying wires, second structure to manage optical fibers, signal-carrying wire cross connects, and optical fiber cross connects. Of course, as discussed above, the method may be implemented using other hybrid cabinets, such as those described herein.

As shown at block 1104, the exemplary method further comprises installing a hybrid cabinet having first structure for managing signal-carrying wires and second structure for managing optical fibers, into an existing communications infrastructure. By using the hybrid cabinet, a section of wires of an existing wire-based infrastructure can be replaced by optical fibers. The section of wires replaced may be only a portion of the wires managed by a particular wire management system. Because the hybrid cabinet is configured to manage both wires and fibers, it is not necessary to add an additional cabinet, rack, or other management system to handle the new fibers that replace the old section of wires. Thus, valuable floor space in the communications facility is preserved.

Migration from wire-based to optical fiber-based communications infrastructure is typically a gradual process. The wires are replaced a little at a time (e.g., at the end of their useful life, when other portions of the communications network are upgraded, and/or as funds become available, etc.) Thus, it may be desirable for the hybrid cabinet to be modifiable over time to manage different combinations of wires and fibers. Accordingly, as shown at block 1106, subsequent to installation, at least some of the signal-carrying wires managed by the cabinet are replaced with optical fibers as the infrastructure is further migrated toward an optical fiber-based infrastructure.

If the cabinet includes signal-carrying wire cross connects and optical fiber cross connects, the method 1100 may include, subsequent to installation, replacing at least some of the signal-carrying wire cross connects managed by the cabinet with optical fiber cross connects, as shown at block 1108.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A hybrid cabinet for managing wires and optical fibers, the cabinet comprising:
   a housing;
   a stationary rack in the housing for managing one of wires and optical fibers, the stationary rack having a front face and a back face;
   a movable rack in the housing for managing the other of wires and optical fibers, the movable rack having a front face and a back face and being movable relative to the stationary rack to provide access to both the front and back faces of both the stationary and movable racks; and
   a plurality of movable trays coupled to the stationary rack and movable relative to the stationary rack, and a plurality of modules coupled to the movable rack and fixed against movement relative to the movable rack, wherein the movable trays are pivotable relative to the stationary rack to provide access to fiber connectors managed by the trays.

2. The cabinet of claim 1, the movable rack being movable between a first position providing access to only one face of each of the stationary and movable racks, and a second position providing access to both the front and back faces of both the stationary and movable racks.

3. The cabinet of claim 2, wherein in the first position the movable rack is proximately adjacent to the stationary rack such that adjacent faces of the movable and stationary racks are inaccessible, and in the second position faces of the movable and stationary racks are spaced apart such that both front and back faces of each of the movable and stationary racks are accessible.

4. The cabinet of claim 1, the housing comprising an enclosure having top, bottom, front, back, and side walls, the front and back walls comprising doors for providing access to the contents of the housing from opposed, front and rear directions.

5. The cabinet of claim 1, the cabinet being an outdoor cabinet, with the housing providing a substantially weather-tight enclosure for protecting the contents of the cabinet from the weather.

6. The cabinet of claim 1, the movable rack being pivotably movable relative to the cabinet and the stationary rack, such that the movable rack can be swung out to provide access to both faces of the movable rack.

7. The cabinet of claim 1, the movable rack being movable between a first position in which the trays and modules are each accessible from only one side, and a second position in which the trays and modules are accessible from both sides.

8. The cabinet of claim 1, wherein each tray comprises a plurality of fiber optic cross connects, and wherein each module comprises a plurality of wire cross connects.

9. The cabinet of claim 1, further comprising a plurality of slack storage spools coupled to at least one of the stationary rack and the movable rack and arranged in a W-shape.

10. A cabinet for managing wires and optical fibers, comprising:
    a first rack in the cabinet having a plurality of moveable trays for managing optical fibers; and
    a second rack in the cabinet proximate to the first rack, a plurality of modules being mounted to the second rack for managing wires,
    wherein at least one of the first and second racks is movable at least partially out of the cabinet and away from the other of the first and second racks, to provide access to both sides of each of the first and second racks, wherein each movable tray comprises a plurality of fiber optic cross connects, and wherein each module comprises a plurality of wire cross connects.

11. The cabinet of claim 10, the movable rack being movable between a first position providing access to only one face of each of the first and second racks, and a second position providing access to both front and back faces of the both the first and second racks.

12. The cabinet of claim 11, wherein in the first position the first rack is proximately adjacent to the second rack such that adjacent faces of the first and second racks are inaccessible, and in the second position faces of the first and second racks are spaced apart such that both front and back faces of each of the first and second racks are accessible.

13. The cabinet of claim 10, the cabinet being an outdoor cabinet providing a substantially weather-tight enclosure for protecting the contents of the cabinet from the weather.

14. The cabinet of claim 10, the movable rack being pivotably movable relative to the cabinet and the other rack, such that the movable rack can be swung out to provide access to both faces of the movable rack.

15. The cabinet of claim 10, wherein the trays are movable relative to the first rack, and the modules are fixed against movement relative to the second rack.

16. The cabinet of claim 10, wherein the trays are pivotable relative to the first rack to provide access to fiber connectors managed by the trays.

17. The cabinet of claim 16, wherein the trays are pivotable into an open space in an interior of the cabinet to provide access to the trays in the interior of the cabinet.

18. The cabinet of claim 16, wherein the trays are pivotable so as to protrude out of the cabinet to provide access to the trays outside of the cabinet.

19. The cabinet of claim 10, wherein the plurality of trays comprises a first stack of trays stacked vertically along one edge of the first rack, and second stack of trays stacked vertically along an edge of the first rack opposed to the one edge.

20. The cabinet of claim 10, the movable rack being movable between a first position in which the trays and modules are each accessible from only one side, and a second position in which the trays and modules are accessible from both sides.

21. The cabinet of claim 10, further comprising a plurality of slack storage spools coupled to at least one of the first and second racks and arranged in a W-shape.

22. A hybrid cabinet for managing wires and optical fibers, the cabinet comprising:
a housing;
a stationary rack in the housing for managing one of wires and optical fibers, the stationary rack having a front face and a back face;
a movable rack in the housing for managing the other of wires and optical fibers, the movable rack having a front face and a back face and being movable relative to the stationary rack to provide access to both the front and back faces of both the stationary and movable racks; and
a plurality of movable trays coupled to the stationary rack and movable relative to the stationary rack, and a plurality of modules coupled to the movable rack and fixed against movement relative to the movable rack, wherein each tray comprises a plurality of fiber optic cross connects, and wherein each module comprises a plurality of wire cross connects.

23. The hybrid cabinet of claim 22, the movable rack being movable between a first position providing access to only one face of each of the stationary and movable racks, and a second position providing access to both the front and back faces of both the stationary and movable racks.

24. The hybrid cabinet of claim 23, wherein in the first position the movable rack is proximately adjacent to the stationary rack such that adjacent faces of the movable and stationary racks are inaccessible, and in the second position faces of the movable and stationary racks are spaced apart such that both front and back faces of each of the movable and stationary racks are accessible.

25. The hybrid cabinet of claim 22, the movable rack being pivotably movable relative to the cabinet and the stationary rack, such that the movable rack can be swung out to provide access to both faces of the movable rack.

26. The hybrid cabinet of claim 22, wherein the movable trays are pivotable relative to the stationary rack to provide access to fiber connectors managed by the trays.

27. The hybrid cabinet of claim 22, the movable rack being movable between a first position in which the trays and modules are each accessible from only one side, and a second position in which the trays and modules are accessible from both sides.

* * * * *